United States Patent [19]

Deprez et al.

[11] 4,408,835
[45] Oct. 11, 1983

[54] VIEWING SYSTEM WITH AUTOMATIC CORRECTION OF THE READING DISTANCE AS A FUNCTION OF THE INCLINATION OF THE VIEWING SCREEN HOUSING

[75] Inventors: Michel Deprez, Epernon; Andre Fromion, L'Haye les Roses; Claude Hardouin, Villiers St Frederic; Jean C. Vilas Boas, Sannois, all of France

[73] Assignee: 501 Compagnie Internationale pour l'Informatique Cii-Honeywell Bull (Societe Anonyme), Paris, France

[21] Appl. No.: 333,745

[22] Filed: Dec. 23, 1981

[30] Foreign Application Priority Data

Dec. 30, 1980 [FR] France .............................. 80 27771

[51] Int. Cl.³ ..................... G03B 21/56; G03B 21/14; G03B 21/22
[52] U.S. Cl. ..................................... 350/117; 312/22; 352/104; 352/242; 353/119; 358/249
[58] Field of Search ....................... 350/117; 353/119; 352/104, 242; 355/45; 312/7.2, 20–30; 358/249, 254

[56] References Cited

U.S. PATENT DOCUMENTS

| | | | |
|---|---|---|---|
| 3,205,771 | 9/1965 | Harrison et al. | 350/117 X |
| 3,746,437 | 7/1973 | Pammer et al. | 352/242 X |
| 3,970,792 | 7/1976 | Benham et al. | 358/254 X |
| 4,145,097 | 3/1979 | Naess et al. | 312/22 X |
| 4,351,592 | 9/1982 | Link et al. | 353/119 X |

FOREIGN PATENT DOCUMENTS 1092907 11/1967 United Kingdom ............... 352/104

*Primary Examiner*—Richard A. Wintercorn
*Attorney, Agent, or Firm*—Kerkam, Stowell, Kondracki & Clarke

[57] ABSTRACT

A viewing system with automatic correction of the reading distance as a function of the inclination of the screen housing. In accordance with the invention, the viewing system comprises a screen housing axially suspended on a U shape base. The screen housing is adjustable by inclination on its axis of suspension. For each inclination two pins carried by the screen housing and sliding in two angled slots carried by the base carry out an automatic correction of the distance separating the operator from the front face of the screen housing.

3 Claims, 9 Drawing Figures

VIEWING SYSTEM WITH AUTOMATIC CORRECTION OF THE READING DISTANCE AS A FUNCTION OF THE INCLINATION OF THE VIEWING SCREEN HOUSING

BACKGROUND OF THE INVENTION

1. Field of the Invention

The present invention relates to arrangements for viewing values or analogs on a screen and more particularly relates to a viewing screen housing orientable as a function of the height of the operator for which the distance separating the eye of the operator from the reading surface of the screen is corrected as a function of the inclination of the screen housing.

2. Description of the Prior Art

Viewing systems for monitoring input-output values are frequently utilized for long periods by operators. As a result, manufacturers have tried to obtain screen housing satisfying the biotechnologic needs of the users and have provided complex systems which are costly and which do not satisfy all of the necessary criteria for good reading. Generally, screen adjustments are difficult and exacting.

SUMMARY OF THE INVENTION

The present invention proposes a viewing system comprising a very simple suspension structure with automatic adjustment permitting automatic correction of the reading distance of the viewing system as a function of its inclination. To this end, an object of the invention is to provide viewing apparatus comprising a screen housing suspended along a horizontal axis on a base in a form of a U, the said screen housing being inclinable along this horizontal axis to provide for the research operator the best conditions for reading.

In accordance with the invention the viewing system comprises means for suspension of the screen housing constituted by cylindrical pins (7) and (8) disposed on opposite sides of the screen housing. The pins are insertable in L shape slots (10) located in the wings of the U of the base (17M). The vertical branches of the L opening extend to the upper part of the wings of the U in such a way as to permit insertion of the cylindrical pins (7) and (8). The horizontal branch of the L permits movement of the screen housing (16M) in horizontal translation. Also included are means for coordination of the movements of the screen housing which may take the form of guide pins (21) and (22) placed on opposite sides of the screen housing (16M) and insertable in slots (15) or (26), (27) formed in the wings of the U of the base (17M). The general direction of the slots (15), (26), (27) is inclined to the horizontal in a way so as to associate with all tipping movement of the screen housing (16M) a movement of horizontal translation of the screen housing (16M) by displacement of the cylindrical pins (7), (8) along the horizontal branch of the slots.

In accordance with another aspect of the invention the guide pins (21) and (22) are removable to permit the introduction or the removal of the screen housing (16M) from its base (17M).

In accordance with still another feature of the invention the guide pins (21) and (22) can be located in pockets to immobolize the screen housing (16M) in a position chosen by the operator.

DESCRIPTION OF THE PREFERRED EMBODIMENTS

Figure 1:
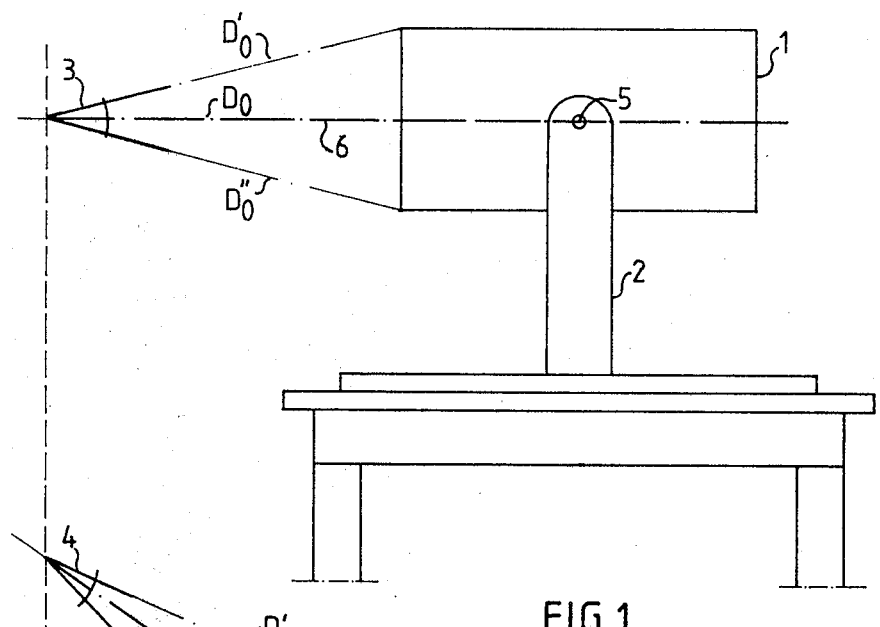
FIGS. 1 and 2 illustrate biotechnological problems present in the actual state of the art.

FIG. 1 shows diagrammatically a viewing assembly such as may be used in research for locating prestored data. This assembly comprises two principal parts; a screen housing (1) which has a substantially parallelopipedal form and a base (2) supporting the screen housing. The base is in the form of a U. The base (2) serves to support the screen housing (1). The screen housing (1) is articulated on its base (2) in a plane perpendicular to the horizontal to permit the operator who reads the information on the screen to position it for easy reading.

The screen may be of the cathode ray tube (CRT) type or other form of optical reader. Because the invention is concerned only with the support and not the details of the screen, there is no reason for a detailed description of such devices and none will be given.

For optimal reading of the entire surface of the CRT screen, be it of that type, it is necessary that the eye (3) of the operator be located on a line (6) passing through the center of the screen and for which the direction is substantially perpendicular to a plane tangent to the center of the cathode screen. This line 6 will be hereinafter called the central reading axis. When the eye (3) of the operator is on the central reading axis (6), the distance which separates the eye (3) of the operator from the surface to be read presents the smallest variation during the course of the reading of the total of the surface to be read. As these distances change, the eye makes an accommodation effort. This effort is reduced or at a minimum when the eye is located along the central reading axis (6).

Figure 2:
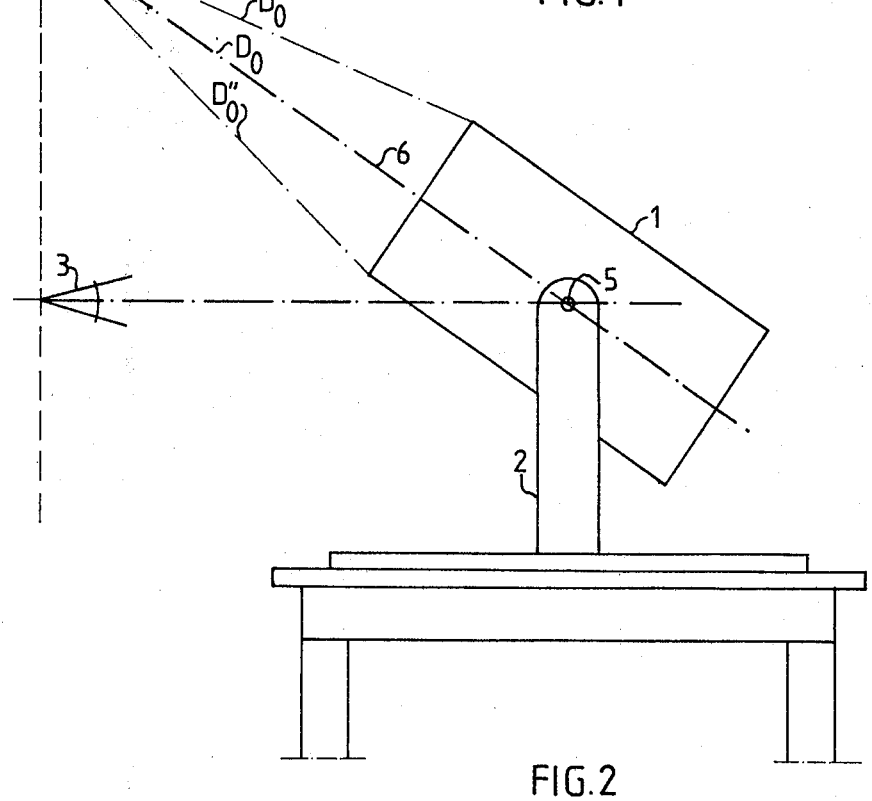

FIG. 1 illustrates the particular case where the central reading axis (6) is horizontal and where the eye of the operator is naturally located on this line (6). This situation is not always possible and it frequently occurs, as seen in FIG. 2, that the operator will incline the screen housing (1), if it is inclinably on its base (2) to bring the central reading axis (6) in line with his eye (4). FIG. 2 shows that the inclination of the screen housing (1) is obtained by the rotation of the said screen housing (1) around an axis (5) which is perpendicular to the sides of the screen housing (1). This rotation is permitted by the manner in which the screen housing (1) is secured on its base (2). In this inclined position, the distance which separates the eye (4) of the operator from the surface to be read is increased with respect to that which exists in the horizontal position of FIG. 1. This increase of distance is an inconvenience for the reading of the screen because it can entrain difficulties for accommodation of the dye during reading.

Figure 3:
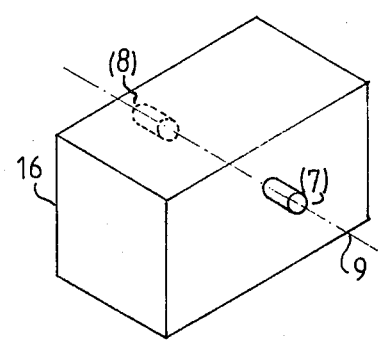
FIG. 3 shows a screen housing with its suspension pins.

FIG. 3 is a schematic showing of a screen housing in accordance with one of the embodiments of the invention. In this embodiment, the screen housing (16) carries on each of two, opposite lateral faces a cylindrical suspension pin (7) and (8). These two pins (7) and (8) are placed on the same axis called the suspension axis of the screen housing (16). This suspension axis (9) passes substantially through the center of gravity of the screen housing (16). It follows, if the screen housing (16) is supported by the two pins (7) and (8), it is in a quasi-indifferent equilibrium around the suspension axis (9). To turn the screen housing (16) around suspension axis (9), the effort required is reduced over that which would be required if the pins were located along another axis.

Figure 4:
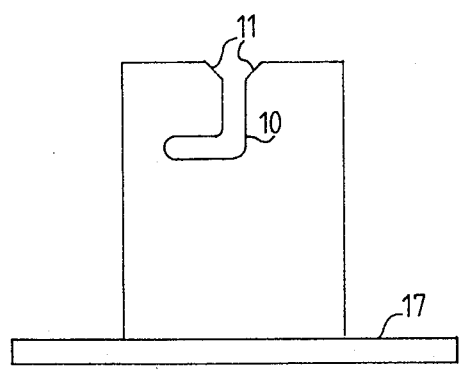
FIG. 4 shows a base with slots in the form of L.

FIG. 4 is a lateral schematic view of a support base (17) in accordance with one of the embodiments of the invention. This base (17) is in the form of U having vertical branches which serve to support the screen housing (16). In each vertical branch of the U, which will be hereinafter called the wings of the base, there is formed on L shape slot (10) of which the horizontal branch is inversed, that is to say, directed from the right toward the left as shown in the drawing. The vertical branch of the L opens at an upper extremity of the wings of the base and has an enlargement (11) increasing in enlargement toward the top. This enlargement (11) is provided to facilitate the introduction of the suspension pins (7) and (8) during the placing of the screen housing (16) in the base (17).

The placing of the screen housing (16) in the base (17) is carried out by placing the screen housing (16) above the base (17) in such a way that pins (7) and (8) are located each above the associated enlargement (11) situated in the wing of the base to which it corresponds. When the pins (7), (8) are thus placed, the screen housing (16) is lowered in such a way that the pins (7), (8) enter the vertical branch of the L and engage the horizontal part of the groove (10) which is located at the junction of the vertical branch and of the horizontal branch of the L. In this position, the screen housing (16) occupies a relatively stable position and can undergo two independent types of movements. The first is a movement of rotation around the axis of the pins (7), (8). This axis is the suspension axis (9) of the screen housing. The second movement is a horizontal translation by displacement of the pins (7), (8) in the horizontal branches of the slots (10).

As has been stated above during the description related to FIG. 2, the operator tilts a screen housing (1) of the type shown in FIG. 2 to cause the central reading axis (6) to pass through the center of his eye (4). This results in an increase in the distance of vision, that is, the distance which separates his eye (4) from the surface to be read.

In the embodiment proposed in FIGS. 3 and 4, the screen housing can be displaced in accordance with two degrees of freedom. During adjustment of the screen housing position, the operator can adjust the inclination of the screen housing (16) on its suspension axis (9) to cause the principal reading axis (6) to pass by his eye (4) and can also position the screen housing (16) along the horizontal branch of the slot (10) to adjust the distance between his eye (4) and the screen.

It appears clearly here that the apparatus of the invention permits the operator to be able to utilize two means of adjustment to provide a better reading of the screen.

Figure 5:
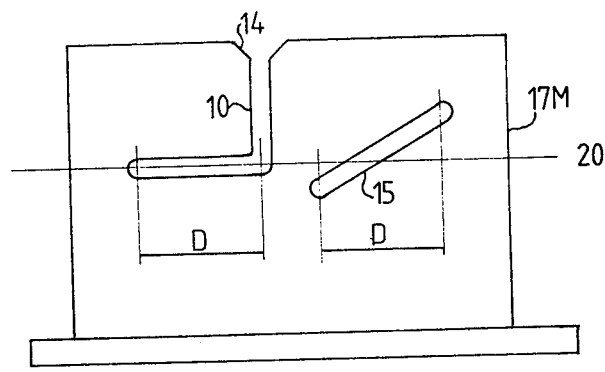
FIG. 5 shows a base with slots in the form of L and additional slots for coordination of movement.

FIG. 5 represents a further improvement realized by an embodiment of the present invention. In this embodiment the base (17) is modified as shown at (17M). This modified base (17M) comprises an L shape slot as in the case of base (17), previously described. Base 17(M) in addition comprises a second slot (15), which is illustrated as straight and on a diagonal for purposes of simplicity of design. The form of slot (15) can be curved in a way to optimize the condition for reading the screen.

Figure 6:
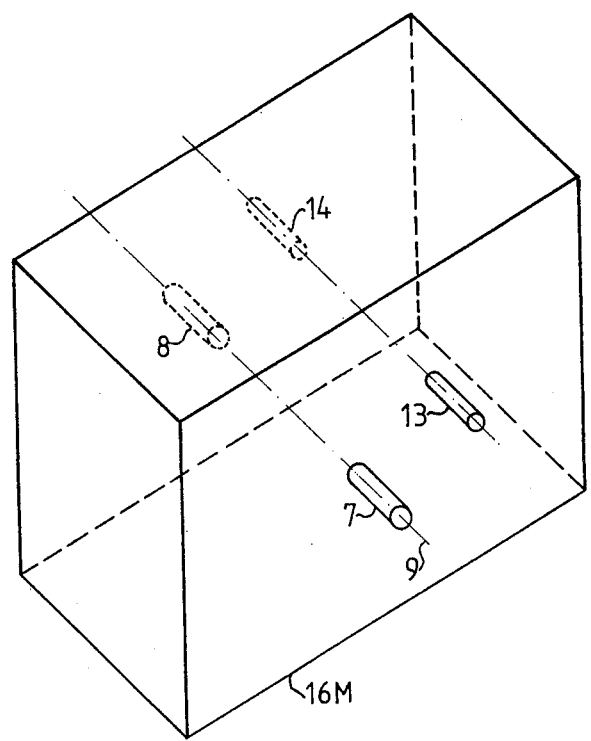
FIG. 6 shows a screen housing with its suspension pins and its guide pins.

This second slot (15) will be hereinafter called the slot for coordination of the movements of the screen housing (16M) modified as shown in FIG. 6, by reasons of slot 15 to fulfill the functioning of this embodiment of the invention. This slot (15) for coordination of the movements of the screen housing 16(M) is located in opposition to the horizontal branch of the L of the slot (10) and is situated on either side of a reference line (20). As shown in FIG. 5, the slot 15 extends to both sides of reference line 20. The form of the slot (15) for coordination of the movements of the screen housing (16M) as well as its general inclination to the horizontal line (20) for reference are functions of the law regarding the best readability of the screen. It can be said that if the horizontal branch of the slot (10) has a length D, the horizontal projections on the horizontal line of reference (20) of the slot (15) for coordination of the movements of the screen housing (16M) will also have a length approximately equal to D as shown in FIG. 5.

FIG. 6 illustrates the modified screen housing (16M) which allows the use of the slot (15) for coordination of the movements of the screen housing discussed above. This screen housing (16M) as modified comprises on each of its opposite lateral faces, in addition to suspension pins (7), (8), guide pins (13), (14). These guide pins (13), (14) are designed to be mounted in the slots (15) for coordination of the movements of the screen housing. These guide pins (13), (14) are removable, or retractable to permit the placement of the screen housing (16) on its base (17M).

To place the screen housing (16M) in the base (17M) the first operation to be carried out is withdrawal of the guide pins (13), (14). This can be carried out either by demounting, or by mechanical function. Once the screen housing (16M) is positioned in the base (17M), that is to say, when the pins (7), (8) for suspension rest on the horizontal branch of the slot (10), it is possible to reposition or to replace the guide pins (13), (14) in such a way that they are introduced into the slots (15) for coordination of the movements of the screen housing.

Under these conditions it clearly appears that when the operator maneuvers the screen housing (16M) by varying its inclination to the horizontal, this inclination is accompanied by a corresponding horizontal movement of the screen. This horizontal movement of the screen is caused by the displacement of the guide pins (13), (14) in the slots (15) for coordination of the movements of the screen housing.

Thus provided that the slots (15) for coordination of the movements of the screen housing have an appropriate profile, there is an adjustment of the reading distance whatever the inclination of angle of the screen housing within the limits imposed by the length of the slots (15) for coordination of the movements.

Figure 7:
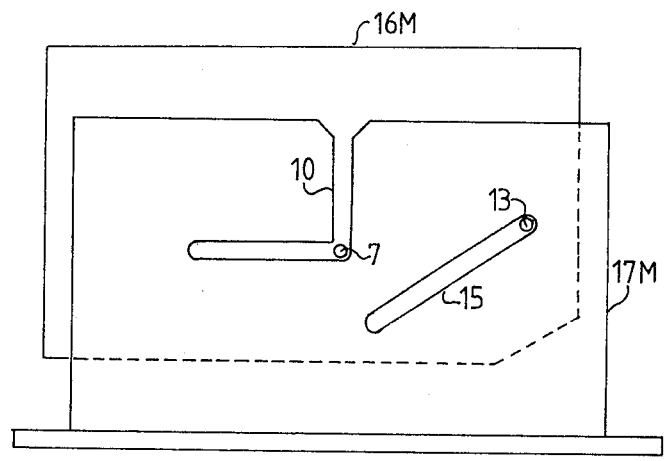
FIG. 7 shows a screen housing in its low position.

FIG. 7 illustrates the screen housing (16M) in its base (17M) when the screen housing (16M) occupies a horizontal position. It there appears that the suspension pins (7), (8) are at rest at the intersection of the two branches of the L of the slot (10) and the pins (13), (14) are stopped at the upper extremity of the slot (15) for coordination of the movements of the screen housing. In this position the screen housing is located in its most withdrawn position in its base (17M).

Figure 8:
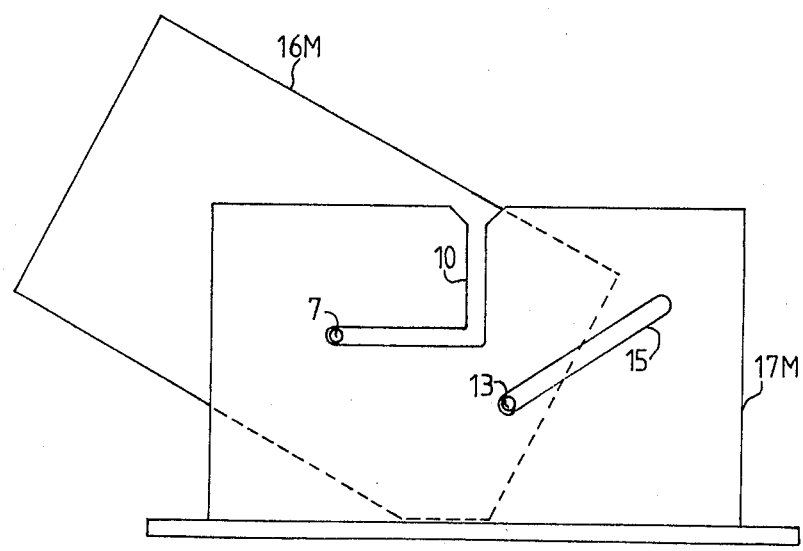
FIG. 8 shows a screen housing in its upper position.

FIG. 8 illustrates the screen housing (16M) in its base (17M) when the screen housing (16M) occupies the most inclined position permitted by the described embodiment. In this position the suspension pins (7), (8) are stopped at the left extremity of the horizontal branch of the L slot (10) and the pins (13), (14) are stopped at the lower extremity of the slot (15) for coordination of the movements of the screen housing. In this position the screen housing is in its most advanced position in its base (19M).

A comparison of FIGS. 7 and 8 clearly show the movement accomplished by the screen housing when its inclination to the horizontal varies.

Figure 9:
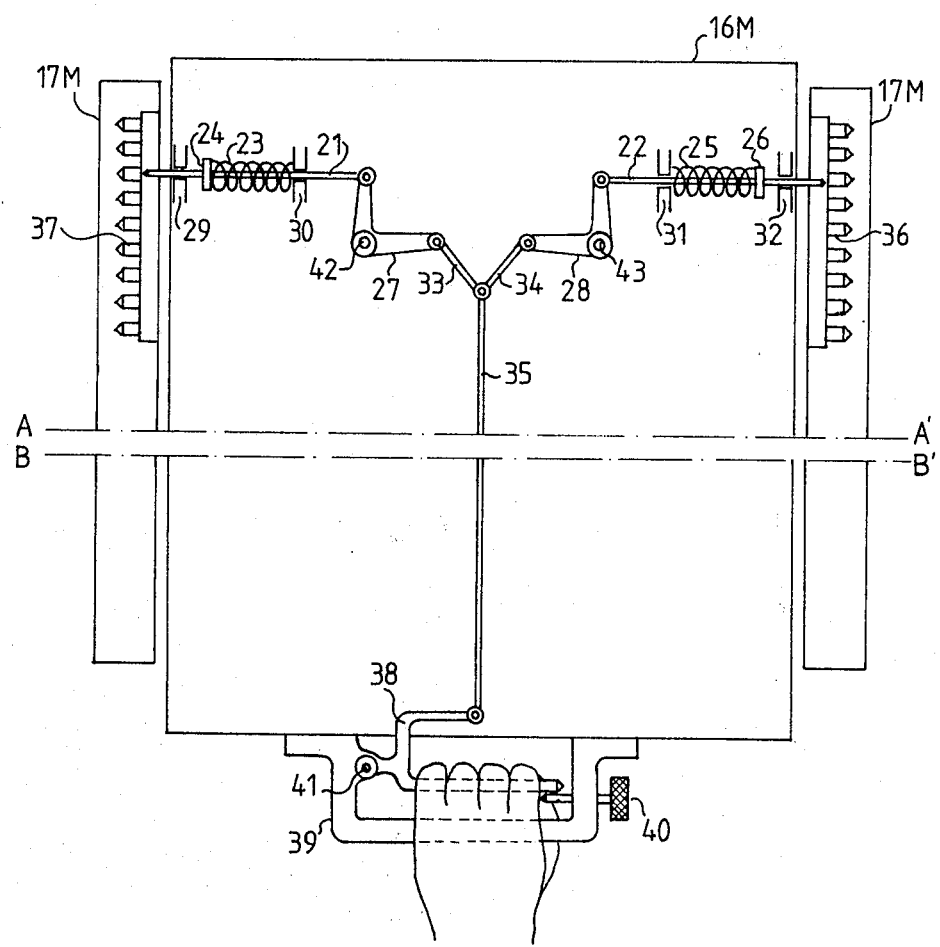
FIG. 9 shows an embodiment of the control system for the guide pins.

FIG. 9 is an upper fragmentary view of the screen housing (16M) in place in its base (17M). This figure illustrates an embodiment of the apparatus including a lever arrangement for movement of the guide pins permitting insertion of the screen housing (16M) in its base (17M). Further, the structure illustrates comprises a means for immobilizing the screen housing (16M) following certain inclinations. In this figure, the guide pins take the form of two rods (21), (22) slidable in guide bearings (29), (30), for the rod (21) and (31), (32) for the rod (22). Guide slots (36) and (37) are each constituted by a blind slot with respect to rods 21 and 22 in the thickness or wall of the base (17M). At the bottom of each slot or as an extension thereof in the wall of base (17M) are formed bores in which the guide pins (21) and (22) can lodge. This enables the screen housing (16M) to be immobilized in an exact position. The functioning of the right portion of FIG. 9 only will be described, since the left side functions similarly in a reverse manner. Thus, the functioning of the left part is easily deduced. Guide pin (22) is applied to the bottom of the slot (36) by a recall spring (25) having one end bearing on the bearing (31) and its other end on a ring or washer (26) secured to the guide pin (22). The left extremity of the guide pin is attached to one extremity of a bell crank (28) which is articulated or pivoted around an axis (43) situated at the elbow of the crank. The other extremity of bell crank (28) is attached to one end of a straight link (34). The other end of straight link (34) is attached to one end of a control shaft (35). The other end of control shaft (35) is attached to a control lever (38) having a form similar to a fork of which one of the branches has been shortened. This control lever (38) is placed within a bracket (39) and pivots at (41) to maneuver the screen housing to which it is attached by the articulation or pivot (41) situated at the base of the fork (38). The shortened branch of the fork (38) is attached to the control rod (35). A long actuator branch of the fork (38) is that on which the operator acts to withdraw the guide pins (21) and (22). The movement of the long branch of the fork (38) is limited by a stop (40) situated on the bracket (30) on the side opposite the pivot point (41) of the fork. The stop (40) is held in place by a spring not shown on the figure. To permit the greatest movement of the fork (38), stop (40) is withdrawn toward the right as viewed in the drawing, to free the movement of the extremity of the long branch of the fork (38). By releasing the stop (40) when the extremity of the long branch of the fork (38) is held in its extreme position, theat is to say, toward the bottom in the case of the figure, the fork (38) is retained in this extreme position. To linerate the fork (38), it is sufficient to withdraw the stop (40) toward the right. The recall springs (23) and (25) turn the fork (38) to its rest position.

From what has been said, it is easy to explain the functioning of this apparatus. The apparatus can occupy three states. The first is the state of repose in which the pins (21) and (22) for guiding are each engaged in one of the blind holes of the guide slots (36) and (37). In this condition, the screen housing (16M) is maintained in a fixed position. The second state is a state of change of inclination of the screen housing in which the pins (21) and (22) for guiding are removed from the blind holes without further being removed from the guide slots (36) and (37). In this state the screen housing can be inclined as wished by the operator, the coordination of the movements being assured by the cooperation of the pins (21) and (22) in the guide slots (36) and (37). Finally, the third state is the state of placing in or removal of the screen housing (16M) from its base (17M). In this case the pins (21) and (22) are completely withdrawn from the guide slots (36) and (37). In this state the operator can freely position or withdraw the screen housing (16M) from its base (17M).

The state of repose is obtained when the fork is liberated, that is to say, neither the stop (40) nor the hand of the operator prevents the action of the recall springs (23) and (25). These recall springs (23) and (25) urge the guide pins (21) and (22) to the bottom of the blind hole which is opposite these guide pins (21) and (22), it being understood that this condition is obtained by the operator by a slight movement of oscillation of the screen housing (16M) around its axis of suspension.

The state of changing of inclination of the screen housing is obtained by a manual action of the operator on the long arm of the fork (38). By drawing this arm toward him, the operator produces a tilting of the arm toward the bottom on the figure. The amplitude of this movement toward the base of the fork (38) is limited by the stop (40) which opposes a greater displacement of the long arm of the fork (38). This limitation of amplitude is provided in such a way that the withdrawal of the guide pins (21), (22) which results will be limited to the disengagement of the guide pins (21), (22) from the blind holes, but the guide pins are still retained in the slots (36), (37).

The withdrawal of the guide pins (21), (22) results in the following operations: The movement of the fork (38) toward the bottom of the figure causes the control lever (38) to pivot clockwise. This control lever (38) pulls shaft (35) downward and transmits movement to the straight links (34) which in turn transmits movement to the bell crank (28). The bell crank (28) pivots or oscillates around its axis (43) moving the guide pin (22) inward which compresses a compression spring (25). As has been explained above, the movement of withdrawal of the guide pin (22) is thus sufficient so that it will leave the blind hole where it was lodged. At this moment the screen housing (16M) is free to oscillate around its suspension system, but the action of the guide pins (22) and (23) in the slots (15) for coordination of the movements of the screen housing is maintained.

The third state which is the state of the placing or withdrawal of the screen housing (16M) from its base (17M) is obtained by an action of the operatoar on the fork (38) which brings it beneath the position defined by the stop (40). This action is made possible by the withdrawal of the stop (40). This withdrawal of the stop (40) is obtained by a movement of the stop toward the right as shown in the figure. Once the withdrawal of the stop (40) is obtained, the operator can move the fork (38) to its extreme position beyond the stop. By the same mechanisms as described above, this movement is accompanied by a complete withdrawal of the guide pins (21) and (22). The movement of the fork being greater, the withdrawal of the guide pins (21) and (22) is greater and the pins completely leave the guide slots (36) and (37). At this moment, nothing opposes the introduction or removal of the screen housing (16M) from its base (17M).

It must be understood that the invention is not limited to the embodiments described and represented and includes all technical equivalents for the means described as well as their combination it these are carried out in accordance with the true spirit of the invention and fall within the full scope of the appended claims.

We claim:

1. In a viewing system having a viewing screen situated within a housing (16M) suspended along a horizontal axis (9) on a U shape base (17M) including vertical wings, the said horizontal axis (9) passing substantially in the region of the center of gravity of the screen housing (16M), the improvement comprising:

means for suspension of the screen housing on the base, said suspension means comprising cylindrical pins (7) and (8) disposed on opposite sides of the screen housing and extending therefrom for insertion in L shape slots (10) in the wings of the base (17M), each of said L shape slots have a vertical branch open at the upper part of the associated wing so as to permit insertion of the said cylindrical pins (7) and (8), and a horizontal branch permitting horizontal translation movement of the screen housing (16M), and means for coordination of the movements of the screen housing, said means for coordination comprising guide pins (21) and (22) disposed on opposite sides of the screen housing (16M) and adapted to be inserted in slots (15) (36) (37) in the wings of the base (17M), being inclined to the horizontal to accomodate tilting movement of the screen housing (16M) and horizontal translation movement of the said screen housing (16M) upon displacement of the said cylindrical pins (7) and (8) along the horizontal branch of the said L shape slot.

2. In a viewing system in accordance with claim 1, wherein the guide pins (21) and (22) are retractable to permit the introduction or the removal of the screen housing (16M) from its base (17M).

3. A viewing system in accordance with claims 1 or 2 wherein the guide pins (21) and (22) are biased outwardly to extend in bores so as to immobilize the screen housing (16M) in a position by an operator.

* * * * *

UNITED STATES PATENT AND TRADEMARK OFFICE
CERTIFICATE OF CORRECTION

PATENT NO. : 4,408,835

DATED : October 11, 1983

INVENTOR(S) : Michel DEPREZ; Andre FROMION; Claude HARDOUIN
and Jean C. Vilas BOAS It is certified that error appears in the above—identified patent and that said Letters Patent is hereby corrected as shown below:

On the cover page, the assignee is listed as:

"501 Compagnie Internationale pour L'Informatique Cii-Honeywell Bull (Societe Anonyme), Paris, France"

The correct name of the assignee is:
--Compagnie Internationale pour L'Informatique Cii-Honeywell Bull (Societe Anonyme), Paris, France--

Signed and Sealed this

Twentieth Day of March 1984

[SEAL]

Attest:

Attesting Officer

GERALD J. MOSSINGHOFF

Commissioner of Patents and Trademarks